(12) United States Patent
    Soderberg

(10) Patent No.: US 10,994,975 B2
(45) Date of Patent: May 4, 2021

(54) LOG LIFTER WITH IMPROVED LEVERAGE AND ADJUSTABILITY

(71) Applicant: Mark S. Soderberg, Conifer, CO (US)

(72) Inventor: Mark S. Soderberg, Conifer, CO (US)

(73) Assignee: Mark S. Soderberg, Conifer, CO (US)

( * ) Notice: Subject to any disclaimer, the term of this patent is extended or adjusted under 35 U.S.C. 154(b) by 135 days.

(21) Appl. No.: 16/203,977

(22) Filed: Nov. 29, 2018

(65) Prior Publication Data

US 2019/0161333 A1    May 30, 2019

Related U.S. Application Data

(60) Provisional application No. 62/592,171, filed on Nov. 29, 2017.

(51) Int. Cl.
*B66F 3/00* (2006.01)
*B66F 15/00* (2006.01)
*B65G 7/12* (2006.01)
*A01G 23/00* (2006.01)

(52) U.S. Cl.
CPC ........... *B66F 15/00* (2013.01); *B65G 7/12* (2013.01); *A01G 23/003* (2013.01)

(58) Field of Classification Search
CPC ......... B66F 15/00; B65G 7/12; A01G 23/003; B66C 1/585

USPC ............... 254/94, 131; 294/11, 17, 104
See application file for complete search history.

(56) References Cited

U.S. PATENT DOCUMENTS

| | | | | |
|---|---|---|---|---|
| 4,433,829 A | * | 2/1984 | Grover | B65G 7/12 254/131 |
| 4,637,769 A | * | 1/1987 | Thorndike | B65G 7/12 294/104 |
| 6,964,442 B1 | * | 11/2005 | Radcliff | B27B 21/00 254/131 |
| 7,131,676 B2 | * | 11/2006 | Hoff | B65G 7/12 294/17 |
| 10,124,995 B2 | * | 11/2018 | Redetzke | B66F 15/00 |

* cited by examiner

*Primary Examiner* — Joseph J Hail
*Assistant Examiner* — Shantese L McDonald
(74) *Attorney, Agent, or Firm* — Kilpatrick Townsend & Stockton LLP

(57) ABSTRACT

A lever device for lifting an object off the ground includes a lever member having a distal end that is positionable immediately adjacent a bottom end of the object. The lever device also includes a grip member that is operable with the lever member to lift the object off the ground. The grip member is adjustable relative to the lever member to accommodate a size of the object being lifted off the ground. The grip member includes a toothed or hooked end that grips an upper surface of the object to be lifted off the ground. The lever device further includes a handle that is graspable by a user to impart a lever force to the grip member and the lever member and thereby lift the object off the ground.

20 Claims, 8 Drawing Sheets

Prior Art

LOG LIFTER WITH IMPROVED LEVERAGE AND ADJUSTABILITY

CROSS-REFERENCE TO RELATED APPLICATIONS

This application claims priority to Provisional U.S. Patent Application No. 62/592,171 filed Nov. 29, 2017, entitled "Log Lifter with Improved Leverage and Adjustability," the entire disclosure of which is hereby incorporated by reference, for all purposes, as if fully set forth herein.

BACKGROUND OF THE INVENTION

Log cants and log hooks have been used for a century or more for moving logs by rolling the logs with these devices. The original devices most often included a wooden handle and a pivoting, arcing hook on a distal end that was designed to swing into a log and pierce it. The handle was designed to be levered to move the log. At some point, a "T" shaped foot was added to the log cants, which allowed the log cants to lever an end of the log and raise it off the ground, typically between 4 and 12 inches. In the raised position the log could be easily cut with a chainsaw with little risk of the chainsaw's chain contacting the ground, which is beneficial in that the ground does not dull the chain and in that the process is safer since there is no concern for kickback of the chainsaw.

However, several problems exist with these existing devices. For example, the pivoting and arched shape hook of existing log cants is only useable for a certain range of log sizes, such as logs having a diameter of between 4 and 16 inches. Specifically, as the hook pivots, its sharp end is presented to the log at varying angles including many angles that are less than ideal. An ideal angle is one in which the hook functions to pierce into and grip the log surface. This gripping is necessary to enable a user to pivot and pry the log into the air with the handle. If the angle is somewhat negative, which is common as the diameter of the log increases, the hook begins to be presented to the log so that the hook no longer functions to self-engage the log surface and thus, the hook is essentially inoperable and no longer useable. Angles that are nearly perpendicular to a face of the log circumference or that are roughly 20 degrees of positive rake are effective to allow the hook to pierce into and grip the log surface. In some instances, an arch of the hook can bottom out on larger logs, which prevents the hook from even meeting the log and therefore the hook is prevented from gripping and engaging the log.

Another significant problem is that as logs get larger and heavier, they become more difficult to lever and in some instances, the lever force that is required to lift the log may be beyond the capability of the person that is trying to lift the log. In such instances, the log cant is entirely useless. This problem arises mainly due to the "T" shaped foot of existing cants that is spaced a significant distance from the center of gravity of the log, thereby creating a large moment of force at the handle where the user grips the hangle. This problem leads to broken wooden handles, bent metal handles, and the like. This problem also results in potential safety issues, such as strained arms, strained shoulders, strained backs, and the like.

BRIEF SUMMARY OF THE INVENTION

The embodiments described herein provide a lever device that may be used to lift logs of varying diameter sufficiently in order to cut the logs or "buck" them. According to one aspect, a lever device for lifting an object off the ground includes a lever member having a distal end that is positionable immediately adjacent a bottom end of the object to be lifted off the ground. The lever member has an outer member that is curved so that the lever member rolls about the outer member as the object is lifted off the ground and the lever member also has an inner member that is curved so that the object rolls or slides onto the inner member as the object is lifted off the ground. The lever device also includes a grip member that is operable with the lever member to lift the object off the ground. The grip member is adjustable relative to the lever member to accommodate a size of the object being lifted off the ground. The grip member has a toothed or hooked end that grips the object so that as a lever force is imparted to the lever member, the grip member pulls the object onto the inner member of the lever member. The lever device also includes a handle that is attached to a proximal end of the lever member. The handle is graspable by a user to impart the lever force to the lever member and thereby lift the object off the ground.

According to another aspect, a lever device for lifting an object off the ground includes a lever member that has a distal end that is positionable immediately adjacent a bottom end of the object to be lifted off the ground. The distal end of the lever member has a tooth or hook that grips the bottom end of the object. The lever device also includes a grip member that is operable with the lever member to lift the object off the ground. The grip member is adjustable relative to the lever member to accommodate a size of the object being lifted off the ground. The grip member has a toothed or hooked end that grips an upper surface of the object to be lifted off the ground. The lever device further includes a handle that is graspable by a user to impart a lever force to the grip member and the lever member and thereby lift the object off the ground.

In one embodiment, the grip member is a 4 bar linkage mechanism that is able to self-adjust relative to the lever member to accommodate the size of the object. In another embodiment, the lever member includes an inner member that is curved so that the object rolls or slides onto the inner member as the object is lifted off the ground and the lever member includes an outer member that is curved so that the lever member rolls about the outer member as the object is lifted off the ground. In such embodiments, the outer member and the inner member may be opposing edges of a single component or the outer member may be a separate component from the inner member and may be separated from the inner member by a gap.

BRIEF DESCRIPTION OF THE DRAWINGS

Various features, aspects, and advantages of the present invention will be better understood when the following detailed description is read with reference to the accompanying figures in which like characters represent like parts throughout the figures, wherein:

FIG. 5 further illustrates a progressive increase in a width of a lever member of the lever device that enables smooth lifting of the log.

DETAILED DESCRIPTION OF THE INVENTION

Figure 1:
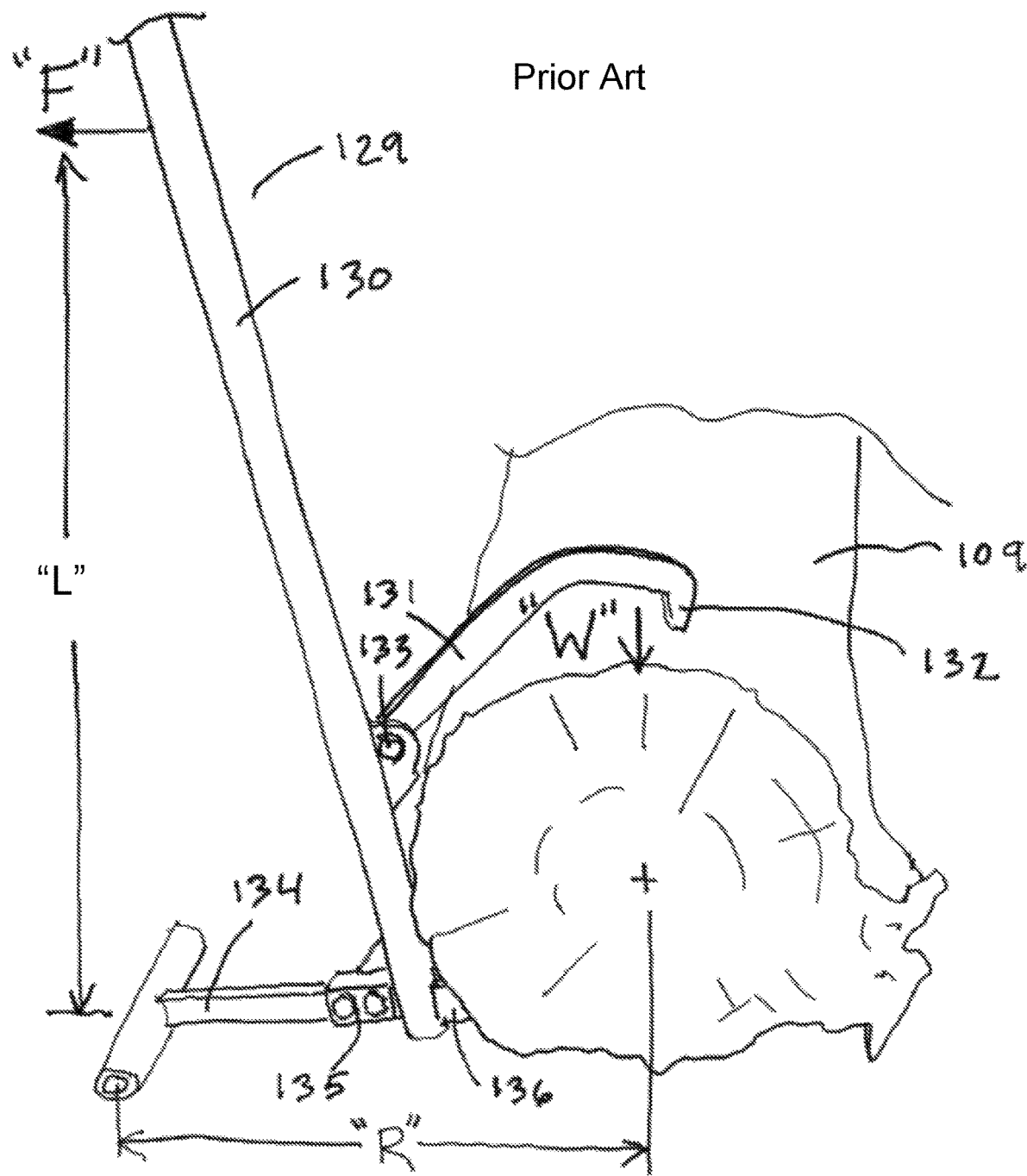
FIG. 1 illustrates a side view of an existing log lifting cant and specifically shows a moment of force that is required to lift a log.

The ensuing description provides exemplary embodiments only, and is not intended to limit the scope, applicability, or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

The embodiments described herein provide a lever device that may be used to lift logs of varying diameter sufficiently in order to cut the logs or "buck" them. The lever device described herein provides advantages over conventional log lifting devices because it provides better leverage, which reduces fatigue and breakage, and because it is designed to conform to logs of a wide range of diameters. In contrast, conventional log lifting devices are more static and only are useable for a small range of log sizes. The lever devices described herein provide a variety of advantages including the following: 1) lifting an end of a log such as for cutting the log into various sizes with a chainsaw for firewood (the lever device allows the log to be cut without dulling the chainsaw's chain because the log is lifted off the ground); 2) a removable handle that may be used for other purposes, such a pry bar for maneuvering logs into a convenient position, cutting and/or chopping small limbs with an axe or hatchet head, etc.; 3) lifting a first end of a log and supporting said first end on a smaller cut log or other object and subsequently lifting a second opposite end and supporting said second end one a smaller cut log or other object so that the entire log is raised off the ground with small intermediate supports; 5) lifting and/or maneuvering logs or other shaped objects (e.g., square or semi-square timbers) in constructing a structure, such as a log home.

The user operation of the lever device is similar to conventional devices in that a body or lever member of the lever device is positioned next to a log with a hooked end of the lever device pushed into or adjacent where the log meets the ground. An arc shaped grip member or hook that is attached to a chain is then laid over the log. The chain and hook conform to the log and the hook is inclined so that the hook is able to self-penetrate the log and grip it. The shape of the lever member creates a very short moment arm that allows the user to pull on the handle and lever the log off the ground relatively easily. The lever member is shaped so that a progressively taller lever member body raises the log farther off the ground as the handle is rotated towards the ground. As the handle is pulled and the handle moves towards the ground, the log is eventually over a center of the lever member's body so that the lever device will tend to stay rotated with the handle near or contacting the ground. In this position, the log is raised above the ground for cutting. The lever member includes anchor points that releasably couple or attach with a sliding chain retainer. Specifically, the sliding chain retainer is configured to be hook onto the anchor points to shorten or lengthen the chain and thereby allow the device to conform to a wide range of tree diameters.

Having described several features of the lever device generally, additional aspects and features of the devices will be more readily apparent with reference to the description of the various figures that is provided herein below.

Referring to FIG. 1, illustrated is a conventional log cant 129. The log cant 129 includes a lifting "T" foot 134 and a handle 130, which is typically a separate wood or metal handle. The handle 130 is connected to an arc shaped hook 131 and end point or member 136. The lifting T foot 134 may be attached to the log cant 129 via one or more bolts 135 or other mechanical fasteners. The arc shaped hook 131 pivots freely around a fixed point 133. The arc shaped hook 131 includes a pierce point or tooth 132. As can be seen in FIG. 1, the design of the log cant 129 results in a relatively large moment that must be overcome to lift a log 109 off the ground. The moment is defined as the product of the weight "W" of the log 109 and the distance or radius "R" between the center of gravity of the log 109 and a pivot point of the lifting T foot 134. Stated differently, the moment is defined as W×R. The distance or radius R is typically quite large and is often at least 12 inches even for relatively small logs. To raise the log 109 of the ground, the user must apply a force to the handle 130 that results in a moment that is greater than W×R. The moment applied by the user is defined as the product of the force "F" applied to the handle 130 by the user and a distance "L" between the force F and the pivot point of the lifting T foot 134, or stated more simply F×L. The large distance R between the log's center of gravity and the lifting T foot 134 results in a substantial force F that must be applied to the handle 130 in order to lift the log 109 off the ground. For larger logs, the force F may be significant enough that applying the force F may cause the handle 130 to bend, break, warp, or permanently distort during lifting of the log 130. The application of such excessive forces may expose the user or other nearby individuals to dangerous conditions.

Figure 2:
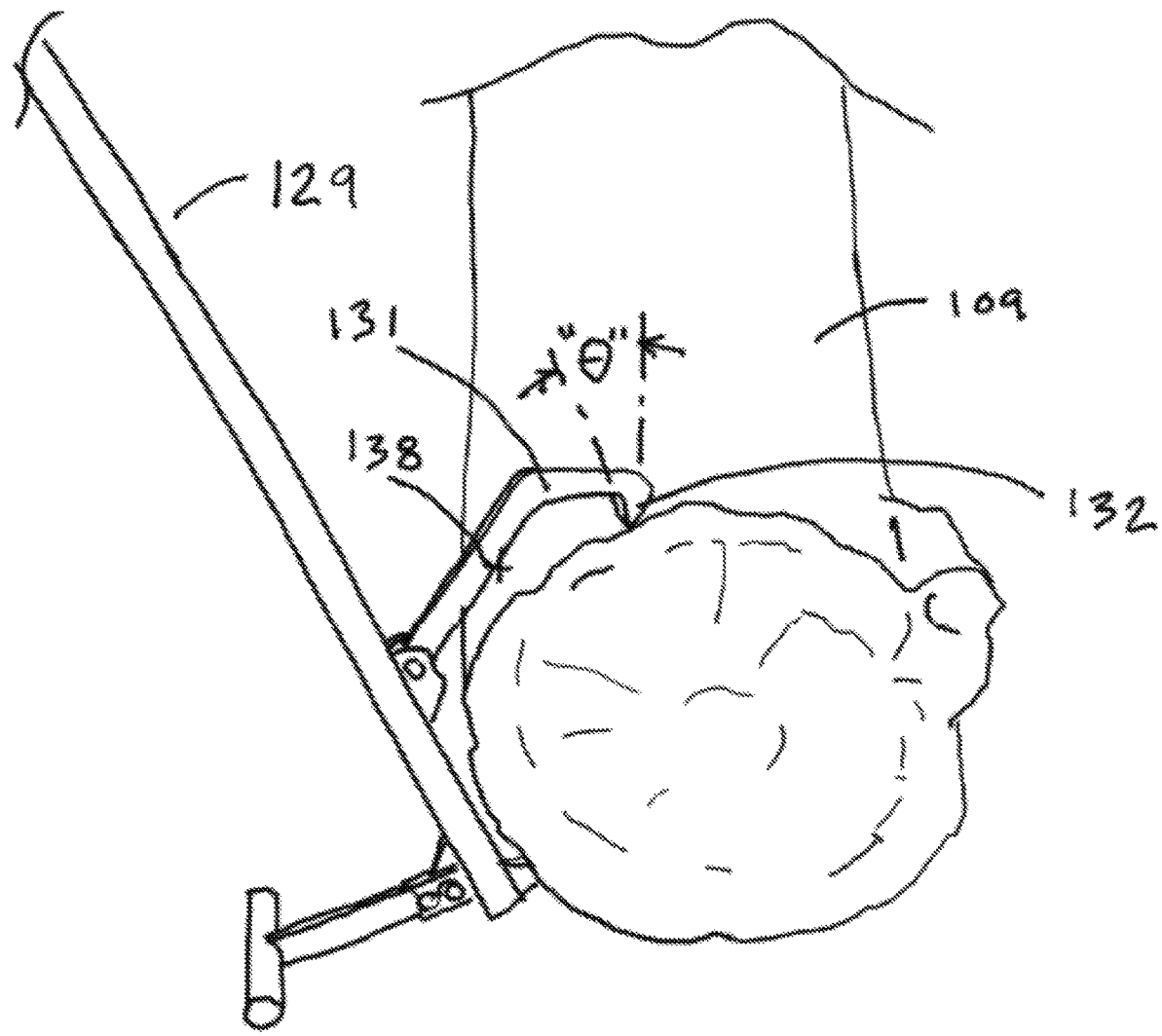
FIG. 2 illustrates a side view of an existing log lifter and specifically shows that as the diameter of a log becomes larger, an angle of presentation of the log lifter's hook is insufficient to enable the hook to self-penetrate into the log.

FIG. 2 illustrates another problem with convention log cants 129, which is due to the arc shaped hook 131 having a fixed length and a fixed curvature. As illustrated, as the log 109 becomes larger, there is a potential for the arced hook 131 to "high center" on the log by the arc shaped hook 131 contacting the log at a point 138 that is proximal to the pierce point or tooth 132. High centering of the arc shaped hook 131 prevents the pierce point 132 from penetrating into and gripping the log 109. In addition, as the log 109 becomes larger, the pierce point 132 is reoriented from a positive rake angle to a negative rake angle (i.e., angle "$\Theta$") in which the pierce point 132 will not tend to self-penetrate into the log 109. Both of these issues dramatically negatively impact the ability of the arc shaped hook 131 to grip the log 109, thereby dramatically effecting the usefulness of the log cant 129.

Figure 3:
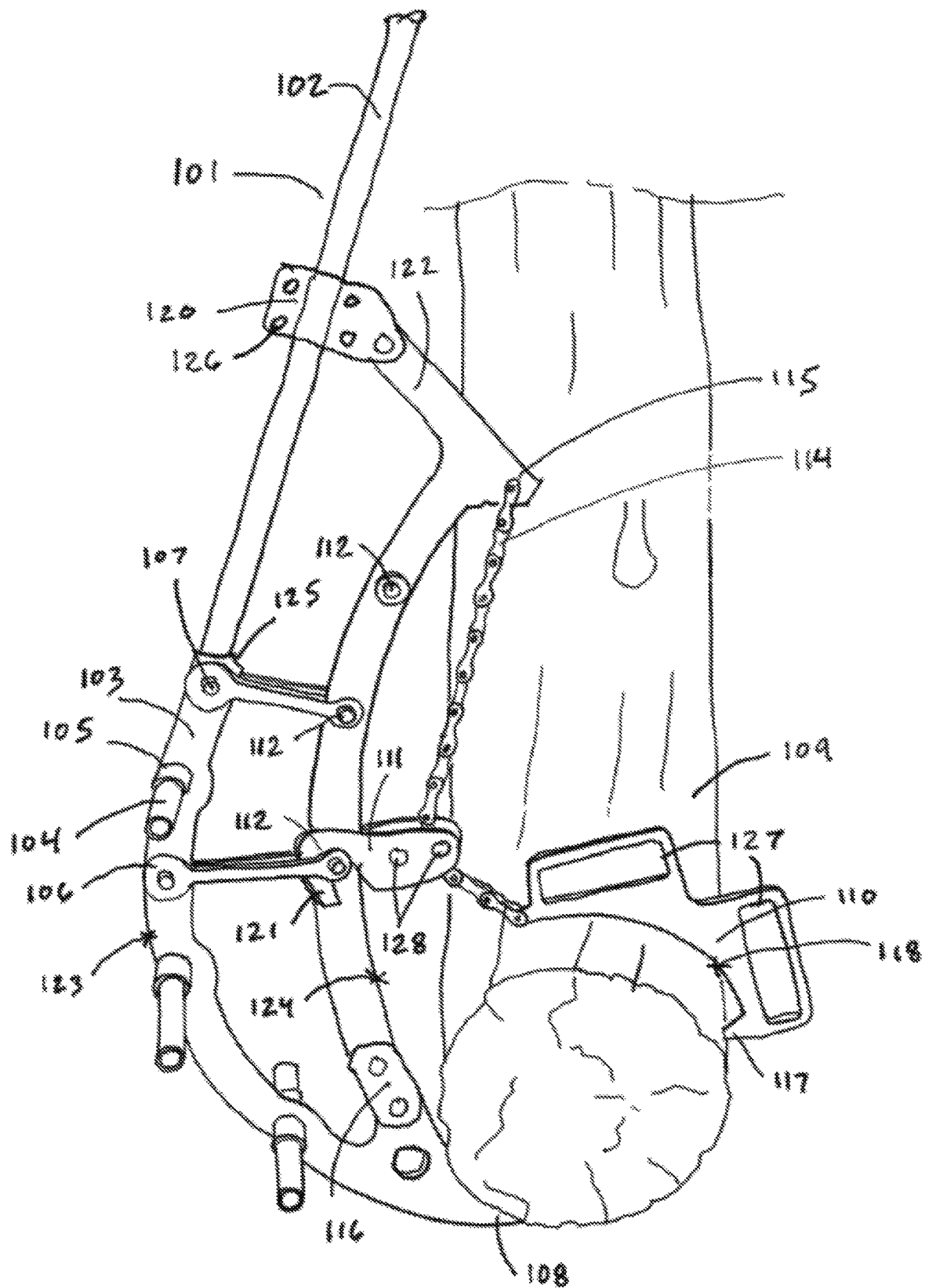
FIG. 3 illustrates a side view of a lever device in an initial position in which the lever device is ready to pick up a log.

FIG. 3 illustrates a lever device 101 that is designed to easily lift objects off the ground, such as various sized logs. The lever device 101 is designed for light weight and uses materials of appropriate strength that are as light as possible for easy carrying and use. The lever device 101 includes a handle 102 that is attached to a proximal end of a lever member, which includes or consists of an outer member 103 and an inner member 122. The handle 102 is graspable by a user to impart a lever force to the lever member and thereby lift the object off the ground. The handle 102 may be made from wood, steel, aluminum, fiberglass, and the like, and is preferably made with fiberglass due to its light weight. The handle 102 may be removably or permanently affixed to the lever member. For instance, the outer member 103 can include an internal or external socket 125 that attaches to the handle 102 with or without a fastener and the inner member 122 may include a bracket 120 that may clamp or be pinned to the handle 102 via one or more fasteners 126. The fasteners 126 could be a cam type quick release fastener that allows the handle to be removed quickly from the inner member 122.

The handle may be removeable from the lever member for easy replacement should it become damaged or for other reasons, such as to use the handle 102 for other related tasks. For example, an end of the handle 102 may have a steel point so that the handle 102 can be removed and used independently as a pry bar, such as for moving logs around. In other instances, the handle 102 could incorporate a hatchet or axe head (not shown), which enables the handle 102 to be removed and used for cutting or removing small branches and limbs from the log 109. This may eliminate or reduce the need for the user to use the chainsaw to remove the branches or limbs, which may save time and efforts since the hatchet or axe may require less effort than a relatively heavy chainsaw.

The outer member 103 of the lever member is designed to contact the ground and is curved so that the lever member rolls about the outer member 103 as the log 109 or other object is lifted off the ground. Specifically, the outer member 103 has a splined perimeter 123 that has a curved shape that is designed to progressively lift the log 109 and remain over center in a raised position. A distal end 108 of the lever member is pointed and is positionable immediately adjacent a bottom end of the log 109 or other object. Alternatively, the distal end 108 of the lever member may be barbed to grip the log 109 and thereby prevent rotational slippage of the log 109 during lifting.

The inner member 122 is typically a separate component from the outer member 103 and is separated from the outer member 103 by a gap. The use of separate inner and outer members, 122 and 103, allows the weight of the lever device 101 to be minimized. In other embodiments, however, the inner member 122 and the outer member 103 may be combined into a single component. The inner member 122 is curved so that the log 109 or other object rolls or slides onto the inner member 122 as the log 109 is lifted off the ground. Specifically, the inner member 122 has a splined perimeter 124 that has a curved shape that is designed to cooperatively function with the outer member 103 so that as the log 109 is lifted, the log rolls or slides into a center position about or relative to the inner member 122. In particular, the splined perimeter 124 of the inner member 122 differs in shape and curvatures from the splined perimeter 123 of the outer member 103 such that a distance between the outer member 103 and the inner member 122 is narrowest near a midpoint of the lever member between a proximal end of the lever member (e.g., bracket 120) and the distal end 108 of the lever member. Stated differently, a distance between the inner member 122 and the outer member 103 typically increases as a point on the splined perimeters, 123 and 124, moves proximally or distally from the midpoint of the lever member. The inner member 122 and/or outer member 103 may be preferably made from aluminum, which is ideal due to its light weight, although the inner member 122 and/or outer member 103 may be constructed of most any material. One or more struts 106 may be used to attach the inner member 122 to the outer member 103 with sufficient strength and rigidity to hold the inner member 122 and outer member 103 in relative position. The struts 106 may be positioned on opposite sides of the inner and outer members, 122 and 103, which increases the moment of inertia and resist lateral bending and buckling. The struts 106 may be constructed of aluminum due to its light weight, or any other desired material. The struts 106 may be attached via fasteners of any type, such as rivets, bolts, lockbolts, screws, and the like.

The lever device 101 also includes a grip member or arc shaped hook 110 that is operable with the lever member to lift the log 109 or other object off the ground. The grip member 110 is adjustable relative to the lever member to accommodate a size of the object being lifted, such as varying log diameters. The grip member 110 has a pierce point or toothed or hooked end 117 (hereinafter pierce point 117). The pierce point 117 is designed to grip into the log 109 or other object so that as a lever force is imparted to the lever member via the handle 102, the grip member 110 pulls the log 109 onto the inner member 122. Adjusting the grip member 110 relative to the lever member ensures that the pierce point 117 is always presented in at a self-penetrating, positive rake angle in relation to the log 109 or other object that is being lifted via the lever device 101.

An inside radius 118 of the grip member 110 is sized smaller than a small log to ensure that the grip member 110 does not bottom out on the log 109 and thereby prevent the pierce point 117 from self-penetrating into the log 109. In some embodiments, the inside radius 118 of the grip member 110 may be about 3 inches. The pierce point 117 has a somewhat positive rake angle relative to the log 109, which allows the pierce point 117 to self-penetrate with minimal user assistance. The design of the grip member 110 ensure that the pierce point 117 contacts the log 109 without bottoming out along the inside radius 118. The pierce point 117 may be sharpened and hardened for greater penetration into the log 109 and/or for improved life. The pierce point 117 is preferably made from low to high carbon steel and can be hardened at the tip only or along the entire body.

The grip member 110 includes one or more hand holds 127 that allow the grip member 110 and pierce point 117 to be easily handled by a user. Specifically, the hand holds 127 allow the grip member to be grasped by a user and positioned around the object, such as the log 109. The hand holds 127 further facilitate in positioning the pierce point 117 about the log 109 in a manner that ensures that the pierce points 117 will bite into the log 109 as the log is lifted off the ground. The pierce points 117 further facilitate in removing the pierce point 117 from the log 109, such as after the log is cut.

The grip member 110 is attached to a chain 114, which is attached to the inner member 122 at a proximal end 115. In some embodiments, the chain 114 is an agricultural chain that has long links to help prevent twisting due to clearance in the chain links. In other embodiments, the chain 114 could be replaced with other flexible members such as conveyor belting, drive belting, long steel links, or other flexible materials. The flexibility of the chain 114 allows the chain 114 to be easily wrapped tangentially around the log 109 and allows the pierce point 117 to always be presented to the log 109 at a self-penetrating, positive rake angle. This ensure that the pierce point 117 will essentially always be in a proper position to bite into the log 109 as the lever device 101 is operated to lift the log 109 off the ground.

To accommodate a large variation in log diameters, the chain 114 may be effectively shortened or lengthened by positioning a coupling link or sliding chain retainer 111 at various attachment points 112 (hereinafter sliding chain retainer 111) along the inner member 122. The chain 114 is trapped between inside and outside faces or components of the sliding chain retainer 111. The chain 114 is also trapped between pins 128 of the sliding chain retainer 111 in a manner that allows the sliding chain retainer 111 to freely slide along or about the chain 114. The sliding chain retainer 111 includes a hook component 121 on the inside and outside faces or components. The hook component 121 is attachable to the inner member 122 at multiple anchor points 112, which enables a position of the grip member 110 to be adjusted relative to the lever member. In the illustrated embodiment, the anchor points 112 correspond to the coupling location of the struts 106 and the inner member 112.

A spacer may be positioned under the 106 struts at the anchor points 112 so that a flanged anchor point is created for the hook component 121 of the sliding chain retainer 111. To couple the sliding chain retainer 111 with the inner member 122 at a specific anchor point 112, the hook component 121 is positioned or hooked over the inside and outside spacers between the struts 106 and inner member 122 at the anchor points 112. As described below, the sliding chain retainer 111 is coupled with an identified anchor point 112 to adjust the size of the grip member 110 relative to the lever member, which enables the grip member 110 and lever member 122 to accommodate essentially any sized log 109 or other object. The chain 114 is rotatably fixed at opposing ends with the inner member 122 and the grip member 110. The chain 114 may be rotatably coupled at the opposing ends with spring type chain connector links (i.e., master links).

In other embodiments, the chain 114 could be shortened without the use of the sliding chain retainer 111 and anchor points 112. For example, the chain 114 could be shortened using a quick release pin at the proximal end 115. The quick release pin may be hooked onto the chain 114 at different points or positions along the length of the chain 114. A similar quick release pin could also or alternatively be used on the opposite distal end that attaches to the grip member 110.

As briefly described above, the outer member 103, the inner member 122, and struts 106 could all be combined into a single shape to reduce costs. In such embodiments, the outer member 103 and the inner member 122 are opposing edges of a single component that has roughly the shape and configuration illustrated in FIG. 3. The single component embodiment is typically heavier than the multi-component version and thus, for weight reducing purposes the multi-component version may be preferred. When the outer member 103 and inner member 122 are separate components, a connector 116 may be used to fasten the two pieces together. The fastener 116 allows the outer member 103 and the inner member 122 to be constructed of dissimilar materials and/or to have differing thicknesses.

To prevent the lever device 101 from tipping over during rotation and lifting of the log 109, the lever device 101 includes a plurality of legs or feet 104 that extend laterally from the outer member 103. Each foot 104 is configured to laterally stabilize the lever device 101 as the lever member is rolled about the outer member 103 as the object is lifted off the ground. Stated differently, the feet 104 are positioned along the outer member 103 for stability. As the handle 102 is pulled and the lever member rotates, the feet 104 take turns stabilizing the lever device 101 and also provide a place for the user to put his or her feet for greater leverage. The feet 104 may be preferably constructed of tubular steel and may have spring pins or spring clips that enable the feet 104 to be removably snapped into positioned inside sockets 105 of the outer member 103. The removability of the feet 104 allows the lever device 101 to be stored in a flat configuration and/or shipped in a smaller packages. In some embodiments, the lengths of the feet 104 may vary and may be longest in a position of highest load, such as near a middle foot that is positioned roughly midway along an arc or rotation of the outer member 103.

Figure 4:
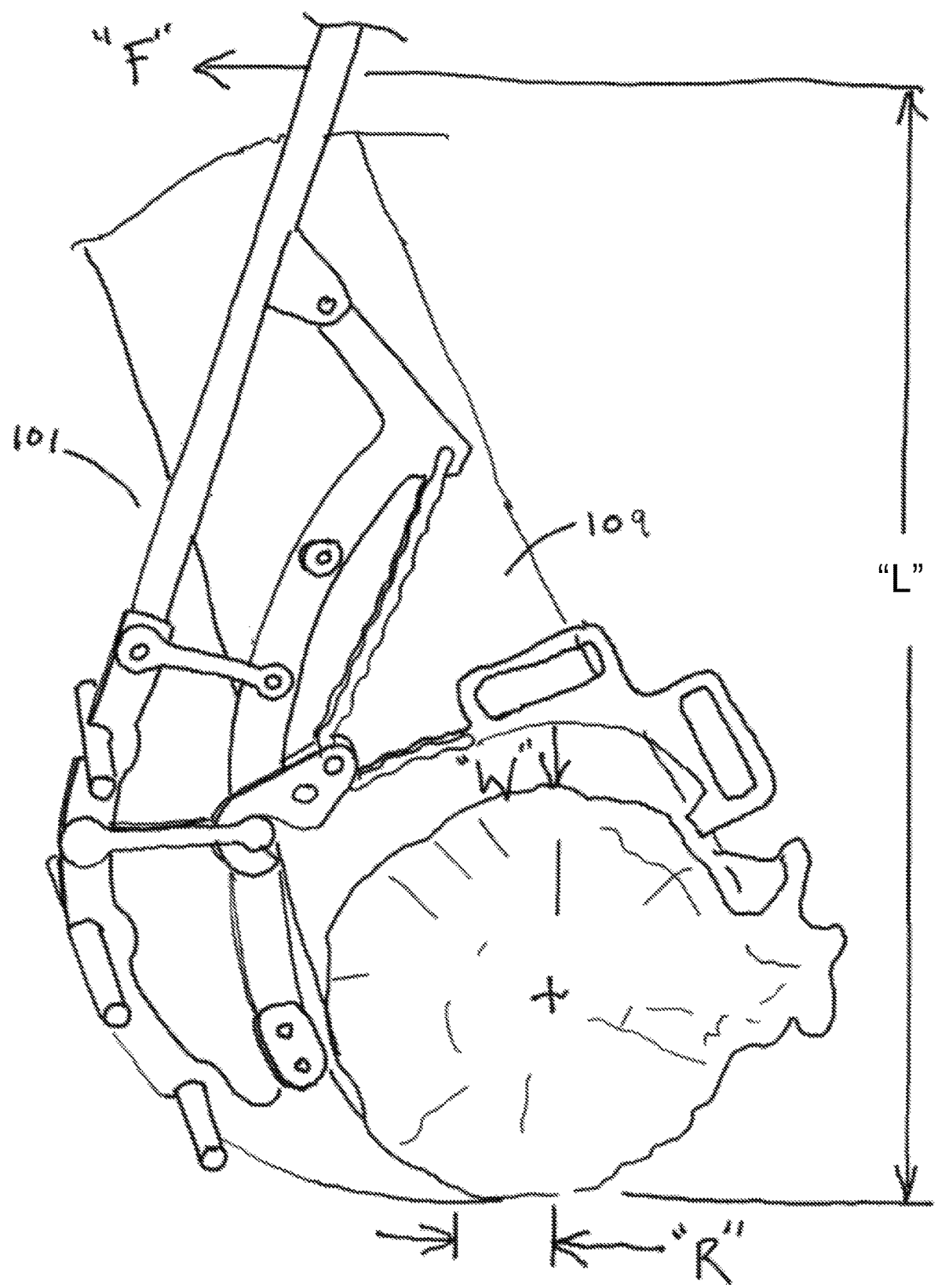
FIG. 4 illustrates a side view of the lever device and specifically shows a moment that is required to lift the log.

FIG. 4 illustrates that the lever device 101 results in a moment that is significantly smaller than the moment that results from conventional devices, such as the device illustrated in FIG. 1. The moment that results from the lever device 101 is defined as the product of the weight "W" of the log 109 and the distance or radius "R" between the center of gravity of the log 109 and a pivot point of the outer member 103. The distance R is significantly shorter than the comparable distance in conventional devices because the curved outer member 103 essentially meets the log 109 at its contact point with the ground, which is typically very close to the log's center of gravity. This substantially decreased distance R results in a tremendous leverage advantage over conventional devices. As with conventional devices, to raise the log 109 of the ground, the user must apply a force to the handle 102 that results in a moment that is greater than W×R. The moment applied by the user is defined by the product F×L where F is the force applied to the handle 102 by the user and L is the distance between the force F and the pivot point of the outer member 103. As illustrated in FIG. 4, the distance L is substantially greater than the distance R, which results in an extremely large increase in leverage or mechanical advantage in lifting the log 109 off the ground. Due to the shape and construction of the lever device 101, it is relatively easy for even heavy logs to be lifted off the ground.

Figure 5:
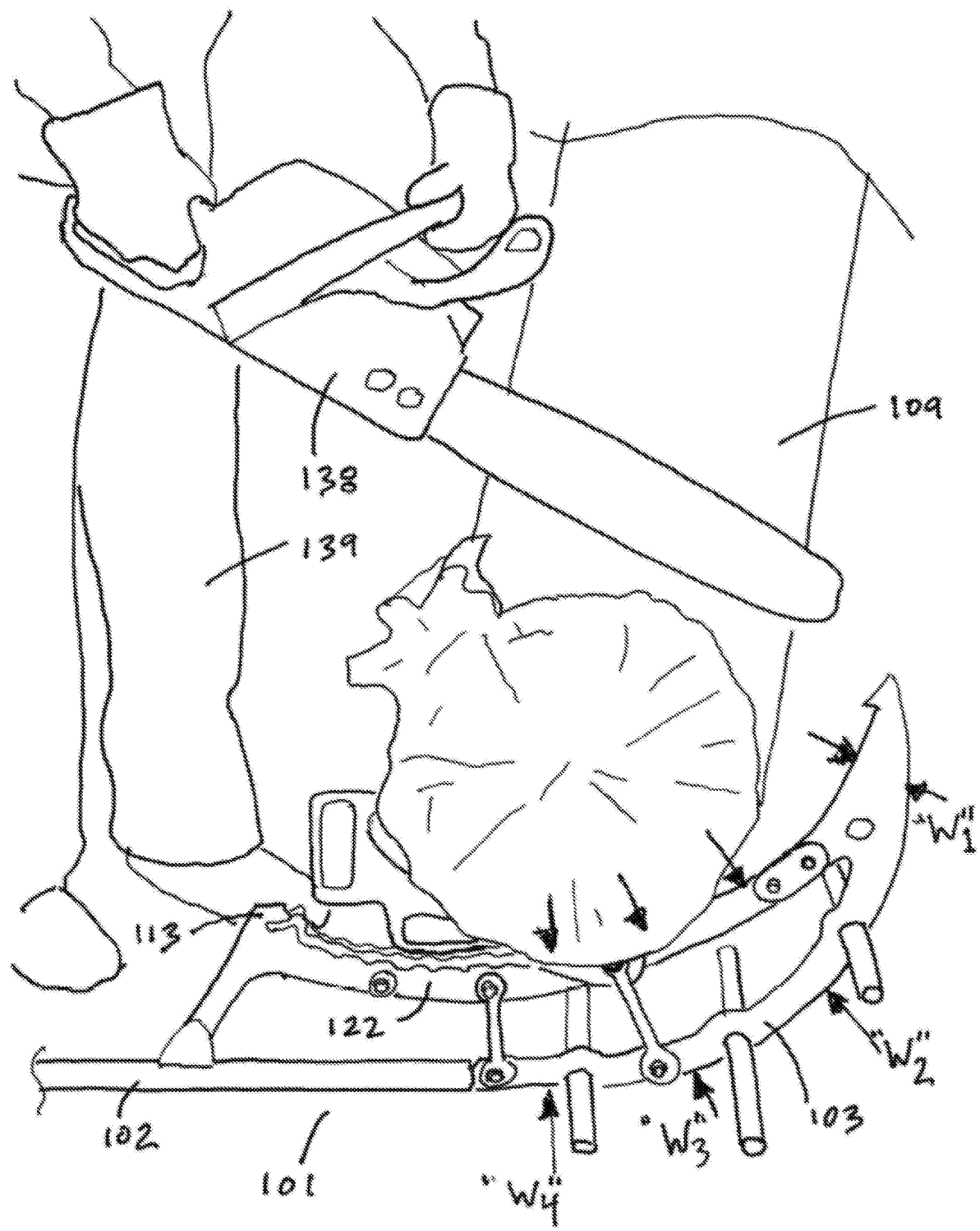
FIG. 5 illustrates a side view of the lever device in a second position in which a log is lifted off the ground and is ready for cutting with a chainsaw or other cutting device.

FIG. 5 illustrates the lever device 101 and log 109 in a position in which the log is ready for cutting. In the figure, the log 109 has been lifted a height "W4" off the ground and is ready for cutting with a chainsaw 138 by a user 139. FIG. 4 also illustrates an orientation of the outer member 103 and inner member 122 that functions to center or stabilize the log 109 about the lever member when the log 109 is lifted off the ground. In particular, a spacing between the inner member 122 and the outer member 103 is designed to increase as the log 109 slides or rolls along the inner member 122 from the distal end 108 and toward a midpoint of the lever member. Specifically, the gap or distance between the outer member 103 and inner member 122 progressively increases so that a first gap W1 between the outer member 103 and the inner member 122 is less than a second gap W2 between the outer member 103 and the inner member 122 and so that the second gap W2 is less than a third gap W3 between the outer member 103 and the inner member 122. In this manner, the outer member 103 and the inner member 122 become farther apart as the log 109 rolls or slides from the distal end 108 and toward the midpoint of the lever member.

At or near the midpoint of the lever member, the gap or distance between the outer member 103 and the inner member 122 decreases. Specifically, the outer member 103 and the inner member 122 are oriented relative to one another so that a fourth gap W4 is less than the third gap W3. In this manner, the third gap W3 is the widest gap on a distal side of the log 109. After the fourth gap W4, the gap or spacing between the outer member 103 and the inner member 122 may again increase so that a narrowest point between the outer member 103 and the inner member 122 is near a midpoint of the lever member. This arrangement ensures that the log 109 will not roll down the lever device 101 toward the user as the log 109 is lifted off the ground. This arrangement also causes the lever device 101 to become stable with the log 109 in a raised position and with the handle 102 usually touching the ground. In an alternative embodiment, the inner member 122 may include a raised projection similar to component 113 that is designed and positioned to stop the log 109 from rolling further along the inner member 122 without requiring a gap or spacing between the inner member 122 and outer member 103 to increase after the fourth gap W4.

Figure 6:
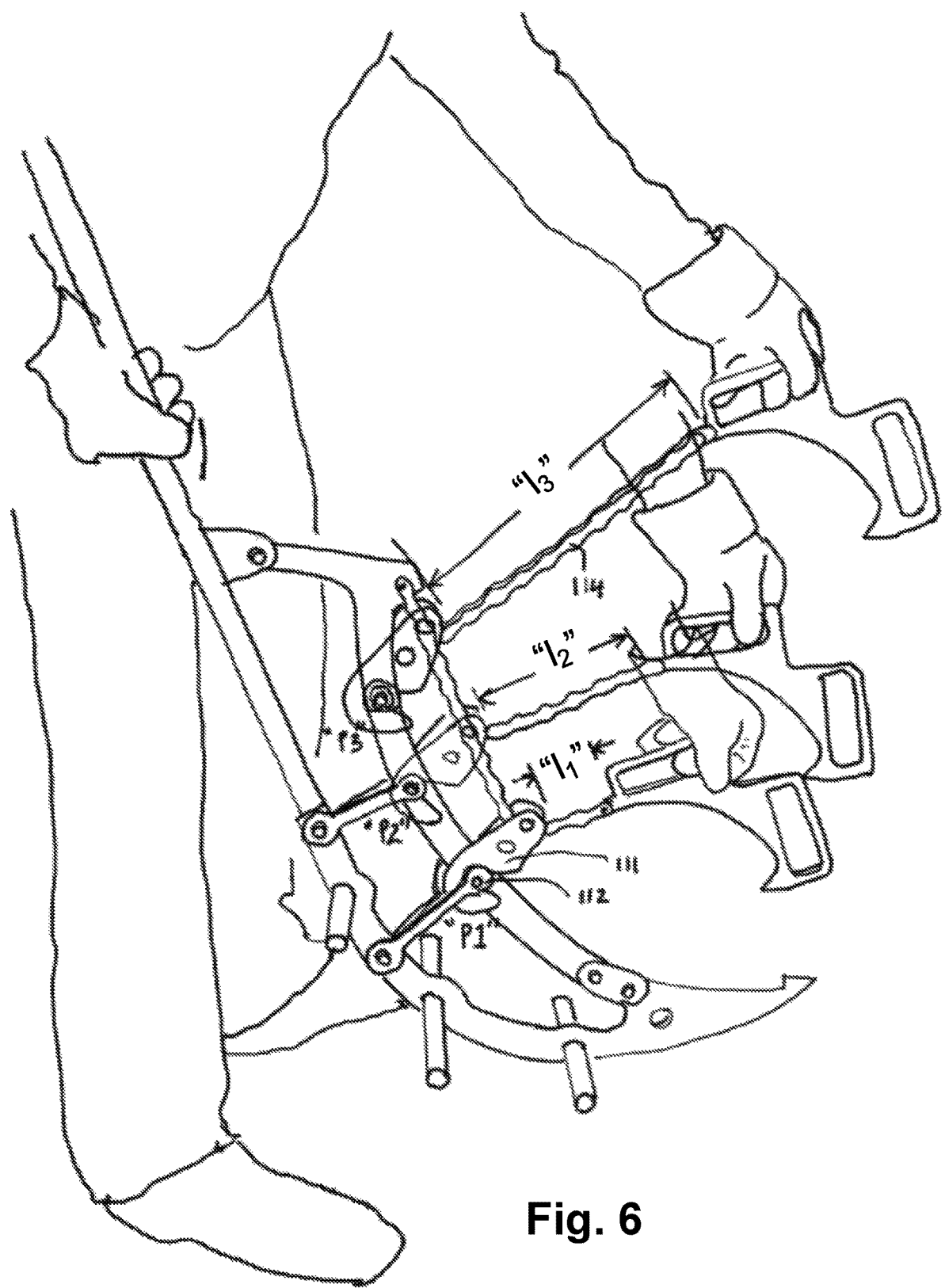
FIG. 6 illustrates a side view of the lever device and specifically shows a wide range of adjustment positions that are possible by repositioning a sliding chain retainer to differing anchor points about the lever member. Repositioning of the sliding chain retainer changes the chain length and allows the lever device to accommodate varying log diameters.

FIG. 6 illustrates several adjustment possibilities or positions for the grip member 110 that allow the lever device 101 to accommodate differing sized logs. Specifically, the sliding chain retainer 111 may be hooked or coupled with the inner member 122 in one of three different positions—i.e., $P_1$, $P_2$, or $P_3$. Coupling the sliding chain retainer 111 with the inner member 122 in the different positions results in the chain 114 to increase or decrease in length. Specifically, as the sliding chain retainer 111 is coupled with the inner member 122 at position $P_1$, the chain has an effective length of $l_1$, which is relatively short and easily able to accommodate logs 109 with small diameters. As the sliding chain retainer 111 is coupled with the inner member 122 at position $P_2$, the chain has an effective length of $l_2$, which is longer than the chain length $l_1$ and easily able to accommodate mid-sized logs 109. As the sliding chain retainer 111 is coupled with the inner member 122 at position $P_3$, the chain has an effective length of $l_3$, which is longer than the chain length $l_2$ and easily able to accommodate large sized logs 109. A person of skill can readily recognize that this adjustment in the effective length of the chain 114 enables the grip member 110 and lever member to accommodate log diameters that vary from very small to very large. In a specific embodiment, the adjustability of the chain 114 and grip member 110 enables the lever device to accommodate log diameters as small as 4 inches and to accommodate log diameters as large as 30 inches. If desired, the inner member 122 may include additional anchor points 112 to enable the lever device 101 to accommodate even smaller or larger sized logs 109.

Figure 7:
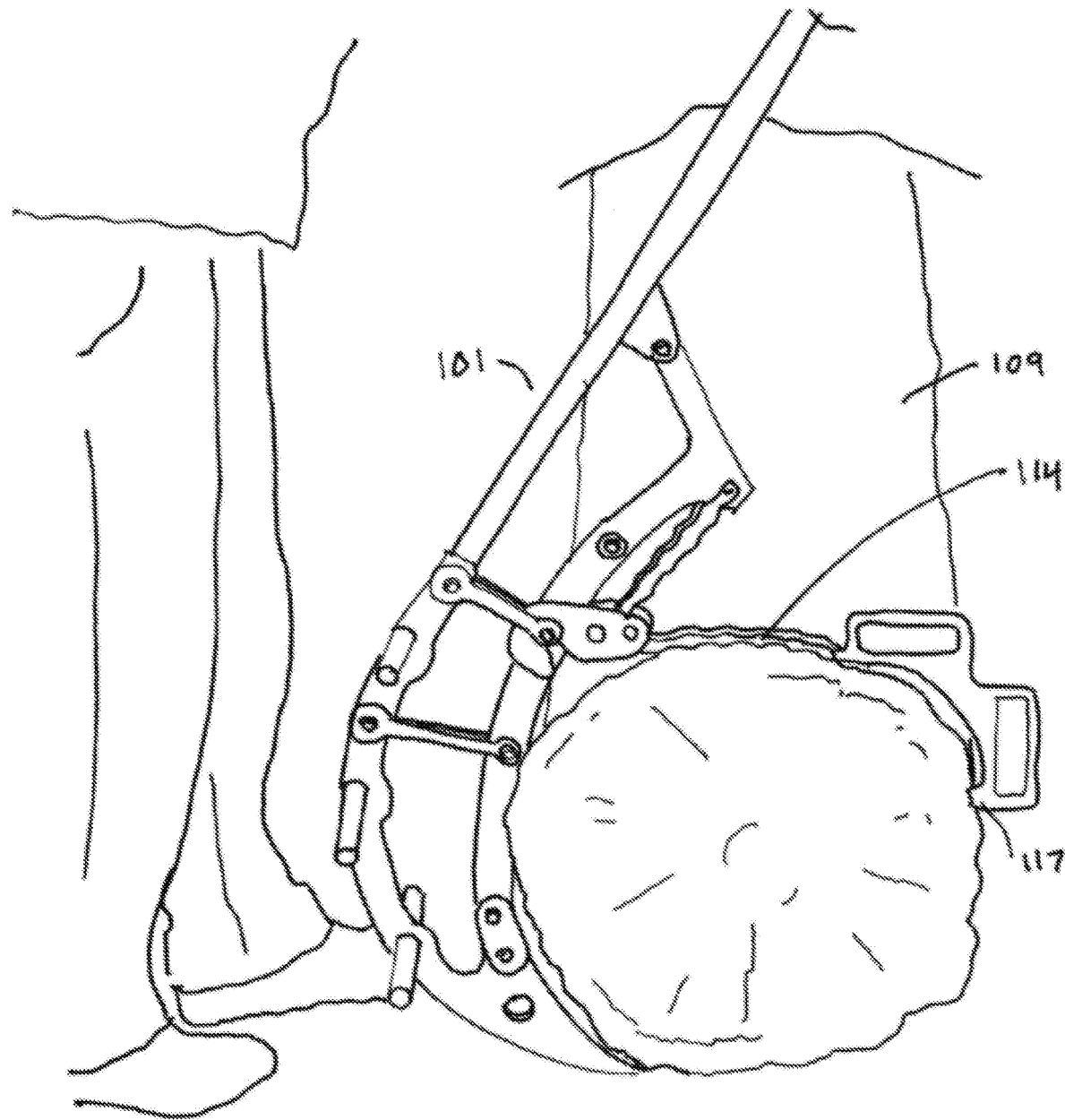
FIG. 7 illustrates a side view of the lever device and specifically shows how the chain and hook conform to a shape of the log so that a hook is always presented to the log at a self-penetrating angle.

FIG. 7 illustrates that the lever device 101 and gripping member 110 conforming to a relatively large log 109, which conventional devices cannot do. The conformability of the gripping member is key to ensuring that the pierce point 117 is in a position of positive rake for self-penetration and maintenance of the log grip during log lifting.

Figure 8:
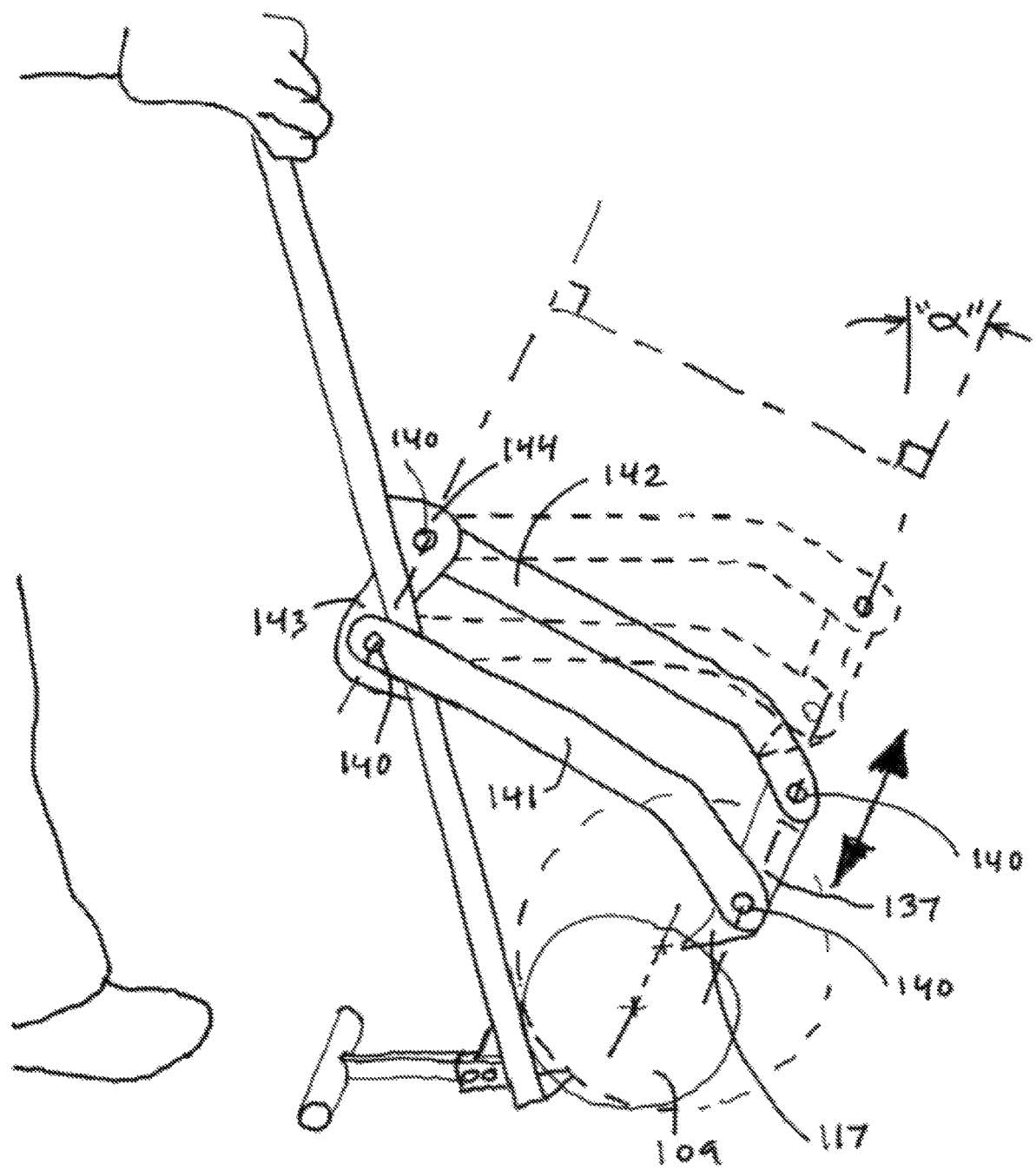
FIG. 8 illustrates an embodiment of a different lever device that employs a 4-bar linkage to present a hook at a self-penetrating angle in order to allow the lever device to accommodate a wide range of log diameters.

FIG. 8 illustrates an alternative embodiment in which the grip member is a 4 bar linkage mechanism that is able to self-adjust relative to the lever member to accommodate the size of the log 109 or other object to be lifted by the lever device 101. The alternative embodiments is configured to maintain a positive rake angle throughout a range of log diameters. In particular, a link 137 of the 4 bar linkage mechanism is configured to remain parallel to a line drawn through its pivot points as the distance between the pivots 140 on link 137 are the same as the distance between the pivots 140 on the brackets 143 and 144. The 4 bar linkage mechanism can be designed so that the angle it follows (i.e., angle α) is aligned with a line that is the centerline of log end as the log diameter grows. Links 141 and 142 are sufficiently curved to never drag and "high center" on the log 109, which allows the piece point 117 to penetrate or bite into the log 109 as the log is lifted off the ground.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A lever device for lifting an object off the ground, the lever device comprising:
   a lever member having a distal end that is positionable immediately adjacent a bottom end of the object, the lever member having an outer member that is curved so that the lever member rolls about the outer member as the object is lifted off the ground, the lever member also having an inner member that is curved so that the object rolls or slides onto the inner member as the object is lifted off the ground;
   a grip member that is operable with the lever member to lift the object off the ground, the grip member being adjustable relative to the lever member to accommodate a size of the object being lifted, the grip member having a toothed or hooked end that grips the object so that as a lever force is imparted to the lever member, the grip member pulls the object onto the inner member of the lever member; and
   a handle that is attached to a proximal end of the lever member, the handle being graspable by a user to impart the lever force to the lever member and thereby lift the object off the ground;

wherein the outer member is a separate component from the inner member, and wherein the outer member is separated from the inner member by a gap; and wherein a distance between the outer member and the inner member is narrowest near a midpoint of the lever member between the proximal end and the distal end of the lever member.

2. The lever device of claim 1, wherein the lever member also include a plurality of legs that extend laterally from the lever member, wherein each of the plurality of legs is configured to laterally stabilize the lever device as the lever member is rolled about the outer member as the object is lifted off the ground.

3. The lever device of claim 2, wherein a first leg of the plurality of legs is larger than a second leg of the plurality of legs.

4. The lever device of claim 1, wherein the grip member is attached to the inner member of the lever member via a chain.

5. The lever device of claim 4, wherein the grip member includes a coupling link that is slidable along the chain and that is attachable to the inner member at multiple anchor points to adjust the position of the grip member relative to the lever member.

6. The lever device of claim 4, wherein the grip member include a handle that is graspable to position the grip member around the object.

7. The lever device of claim 1, wherein the handle is removably coupled with the proximal end of the lever member.

8. The lever device of claim 7, wherein an end of the handle includes a steel point that enables the handle to be used as a pry bar or the end of the handle includes a hatchet or axe head.

9. A lever device for lifting an object off the ground, the lever device comprising:
   a lever member having a distal end that is positionable immediately adjacent a bottom end of the object, the distal end of the lever member having a tooth or hook that grips the bottom end of the object;
   a grip member that is operable with the lever member to lift the object off the ground, the grip member being adjustable relative to the lever member to accommodate a size of the object being lifted off the ground, the grip member having a toothed or hooked end that grips an upper surface of the object; and
   a handle that is graspable by a user to impart a lever force to the grip member and the lever member and thereby lift the object off the ground;
   wherein the grip member is a 4 bar linkage mechanism that is able to self-adjust relative to the lever member to accommodate the size of the object.

10. The lever device of claim 9, further comprising a leg that extends laterally relative to the lever member and the grip member, the leg being configured to stabilize the lever device as the object is lifted off the ground.

11. The lever device of claim 9, wherein the lever member includes an inner member that is curved so that the object rolls or slides onto the inner member as the object is lifted off the ground, and wherein the lever member includes an outer member that is curved so that the lever member rolls about the outer member as the object is lifted off the ground.

12. The lever device of claim 11, wherein the outer member and the inner member are opposing edges of a single component.

13. The lever device of claim 11, wherein the outer member is a separate component from the inner member and is separated from the inner member by a gap.

14. The lever device of claim 13, wherein a distance between the outer member and the inner member is narrowest near a midpoint of the lever member between a proximal end and a distal end of the lever member.

15. The lever device of claim 11, wherein the grip member is attached to the inner member via a chain.

16. The lever device of claim 15, wherein the grip member includes a coupling link that is slidable along the chain and that is attachable to the inner member at multiple anchor points to adjust the position of the grip member relative to the lever member.

17. The lever device of claim 15, wherein the grip member include a handle that is graspable to position the grip member around the object.

18. A lever device for lifting an object off a ground, the lever device comprising:
   a lever member having a curved outer edge and a curved inner edge that each extend to a distal tip of the lever member with the inner edge positioned above the outer edge, the distal tip of the lever member being positionable adjacent the object and the lever member being configured so that the outer edge rolls atop the ground to lift the object off the ground and roll or slide the object onto the lever member atop the inner edge and outer edge;
   a grip member that is operable with the lever member to lift the object off the ground, the grip member being adjustable relative to the lever member to accommodate a size of the object being lifted, the grip member having a toothed or hooked end that grips the object so that as a lever force is imparted to the lever member, the grip member pulls the object onto the inner edge of the lever member; and
   a handle that is attached to a proximal end of the lever member, the handle being graspable by a user to impart the lever force to the lever member and thereby lift the object off the ground.

19. The lever device of claim 18, wherein the outer edge is separated from the inner edge by a gap.

20. The lever device of claim 18, wherein the lever member also include a plurality of legs that extend laterally from the lever member, wherein each of the plurality of legs is configured to laterally stabilize the lever device as the lever member is rolled about the outer edge as the object is lifted off the ground.

* * * * *